United States Patent
Ishii

(10) Patent No.: US 7,009,445 B2
(45) Date of Patent: Mar. 7, 2006

(54) CHARGE PUMP WITH A CONSTANT CURRENT INPUT

(75) Inventor: Toshiki Ishii, Chiba (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 10/885,907

(22) Filed: Jul. 7, 2004

(65) Prior Publication Data
US 2005/0057300 A1    Mar. 17, 2005

(30) Foreign Application Priority Data
Jul. 8, 2003   (JP)  ............................ 2003-193514

(51) Int. Cl.
*G05F 1/10* (2006.01)

(52) U.S. Cl. ........................................ 327/535; 363/60
(58) Field of Classification Search ................ 327/534, 327/535, 537; 307/110; 363/59, 60
See application file for complete search history.

(56) References Cited

U.S. PATENT DOCUMENTS

| | | | | |
|---|---|---|---|---|
| 5,276,646 A | * | 1/1994 | Kim et al. | 365/189.09 |
| 6,107,862 A | * | 8/2000 | Mukainakano et al. | 327/536 |
| 6,771,115 B1 | * | 8/2004 | Nakano | 327/536 |
| 6,865,116 B1 | * | 3/2005 | Kim et al. | 365/189.08 |

* cited by examiner

*Primary Examiner*—Terry D. Cunningham
*Assistant Examiner*—Thomas J. Hiltunen
(74) *Attorney, Agent, or Firm*—Adams & Wilks

(57) ABSTRACT

A semiconductor integrated circuit device capable of avoiding noise generation and suppressing occurrence of an erroneous operation. Provided is a current limiting circuit where a current flowing in an output terminal of a charge pump circuit is sensed with a sensing resistor to be detected by a current detecting circuit to thereby cause an input current to constantly flow in an input terminal of the charge pump circuit in an amount approximately twice larger than an output current, whereby a current is kept constant to suppress a peak current and to avoid the noise generation. Consequently, other circuits connected to an input power source shared with the charge pump circuit are kept from erroneously operating.

2 Claims, 3 Drawing Sheets

CHARGE PUMP WITH A CONSTANT CURRENT INPUT

BACKGROUND OF THE INVENTION

1. Field of the Invention

The present invention relates to a semiconductor integrated circuit device, in particular, a current limiting mechanism for noise reduction in a charge pump circuit, which restricts noise generation in the charge pump circuit in a semiconductor integrated circuit device.

2. Description of the Related Art

FIG. 2 shows a conventional charge pump circuit. In the charge pump circuit, a pump capacitor is temporarily charged by an input power source and then, a voltage of the pump capacitor is further stepped up to charge an output capacitor. The charge pump circuit allows a current to directly flow into the pump capacitor and into the output capacitor, thereby causing a large peak current to instantly flow (see U.S. Pat. No. 5,550,728, for example).

However, the current directly flows from the input power source into the pump capacitor and into the output capacitor in the conventional charge pump circuit. This causes a large peak current to instantly flow upon charging the capacitor. As a result, a voltage of the input power source varies to generate noise, which faces the possibility that other circuits connected to the input power source shared with the charge pump circuit erroneously operate.

SUMMARY OF THE INVENTION

An object of the present invention is to suppress a peak current flowing from an input power source into a pump capacitor and into an output capacitor in a charge pump circuit to thereby avoid noise generation.

In order to attain the above-mentioned object, provided is a current limiting circuit where a current flowing in an output terminal of a charge pump circuit is sensed with a sensing resistor to be detected by a current detecting circuit to thereby cause an input current to constantly flow in an input terminal of the charge pump circuit in an amount approximately twice larger than an output current, whereby a current is kept constant to suppress a peak current and to avoid the noise generation. Consequently, other circuits connected to the input power source shared with the charge pump circuit are kept from erroneously operating.

A semiconductor integrated circuit device according to the present invention includes: a sensing resistor for detecting a load current in an output terminal of an n-times step-up charge pump circuit; a current detecting circuit for detecting a current flowing in the sensing resistor; and a current limiting circuit for adjusting a current value such that a current flows in an input terminal of the n-times step-up charge pump circuit in an amount n times larger than the current flowing in the sensing resistor in accordance with a current value of the current detected by the current detecting circuit, in which the current flowing in the input terminal of the n-times step-up charge pump circuit is kept at the current value n times larger than the current value of the current flowing in the output terminal thereof.

DETAILED DESCRIPTION OF THE PREFERRED EMBODIMENT

Using a semiconductor integrated circuit device according to the present invention enables a current flowing from an input power source to be kept constant such that its current value is about n times larger than an output load current and stabilizes a voltage of the input power source to thereby suppress noise generated in the input power source and avoid an erroneous operation in other circuits connected to the input power source shared with a charge pump circuit.

Hereinafter, a description will be made of a case of using a two-times step-up charge pump circuit according to an embodiment of the present invention, but the same applies to a three- or four-times step-up charge pump circuit.

(Embodiment)

Figure 1:
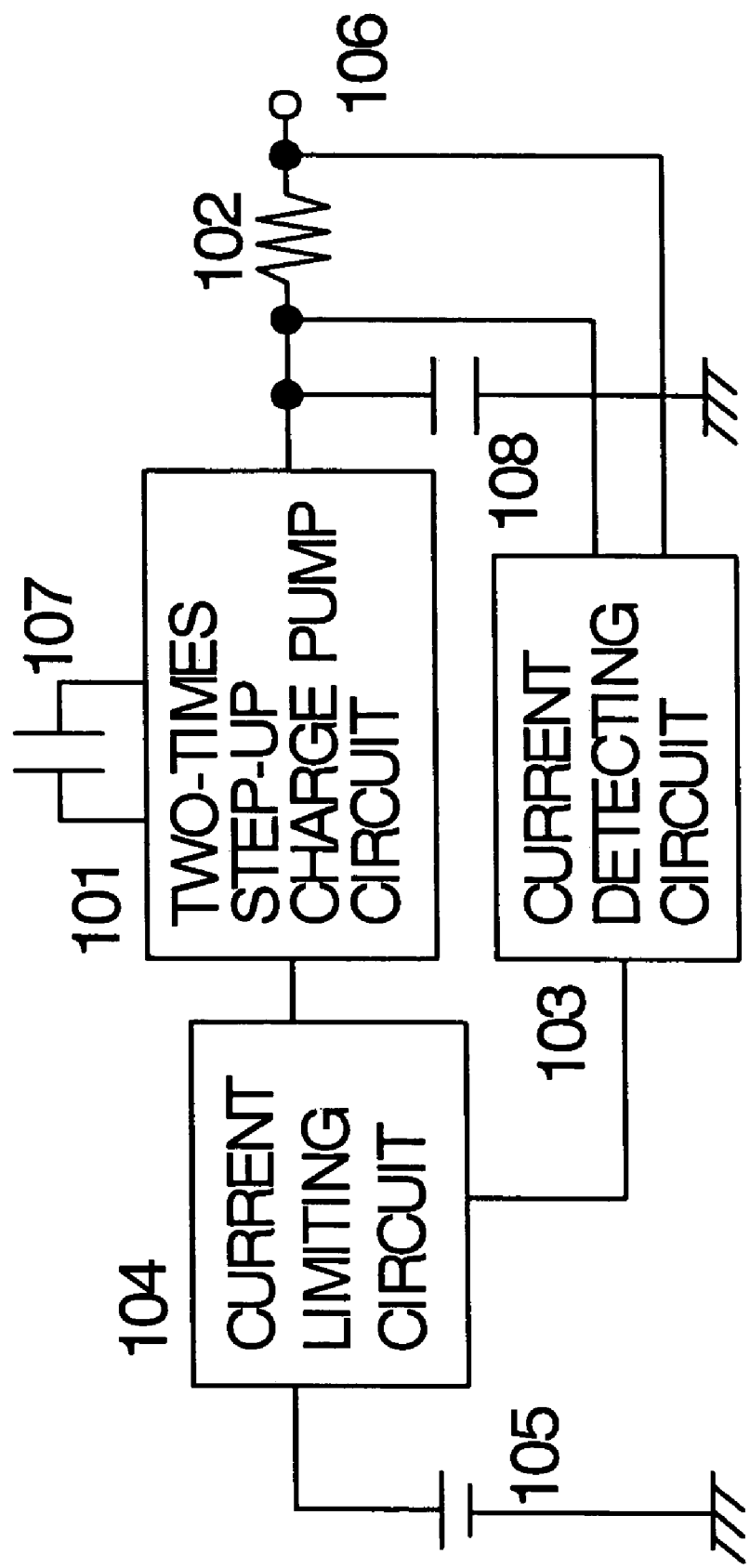
FIG. 1 shows a current limiting mechanism for noise reduction in a charge pump circuit according the present invention.
Figure 2:
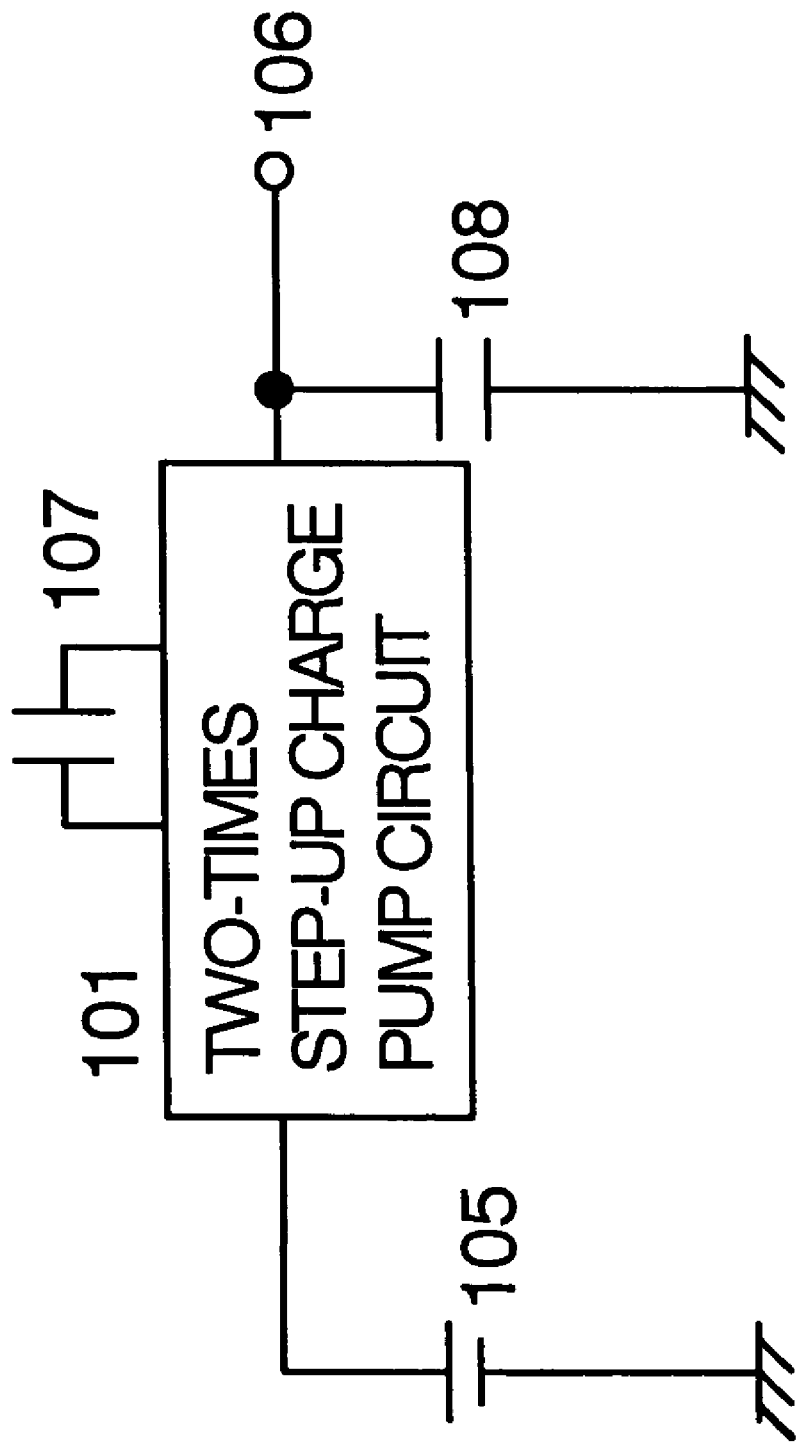
FIG. 2 is a circuit diagram showing a conventional change pump circuit.

Hereinbelow, the embodiment of the present invention will be described with reference to FIG. 1. FIG. 1 shows a current limiting mechanism for noise reduction in a charge pump circuit according to the present invention.

First of all, referring to FIG. 1, the current limiting mechanism for noise reduction in a charge pump circuit is described. The mechanism is composed of a two-times step-up charge pump circuit 101, an output current sensing resistor 102, a current detecting circuit 103 for detecting a current flowing in the sensing resistor, and a current limiting circuit 104 for limiting an input current.

A current flowing in an input terminal of the charge pump circuit can be adjusted according to an output current by using the current limiting mechanism for noise reduction in a charge pump circuit thus configured. In principle, the two-times step-up charge pump circuit can step up an output voltage to a level twice an input voltage level by causing the input current twice the output current to flow therein. Under the above assumption, if a current twice the output current can be constantly supplied as the input current even when the output current varies, it is possible to step up the voltage twofold. To that end, the following adjustment is effected. That is, the current flowing in the output terminal is sensed with the output current sensing resistor 102. The current detecting circuit 103 compares the potentials at both ends of the resistor to detect a potential difference. The current limiting circuit 104 for supplying to the input terminal a current corresponding to the potential difference causes a current twice the output current to flow as an input current. Hence, the two-times step-up charge pump circuit is constantly supplied with an input current twice an output current irrespective of an output current value to thereby step-up the voltage. Therefore, the input current is kept at a constant value to suppress noise generation.

Figure 3:
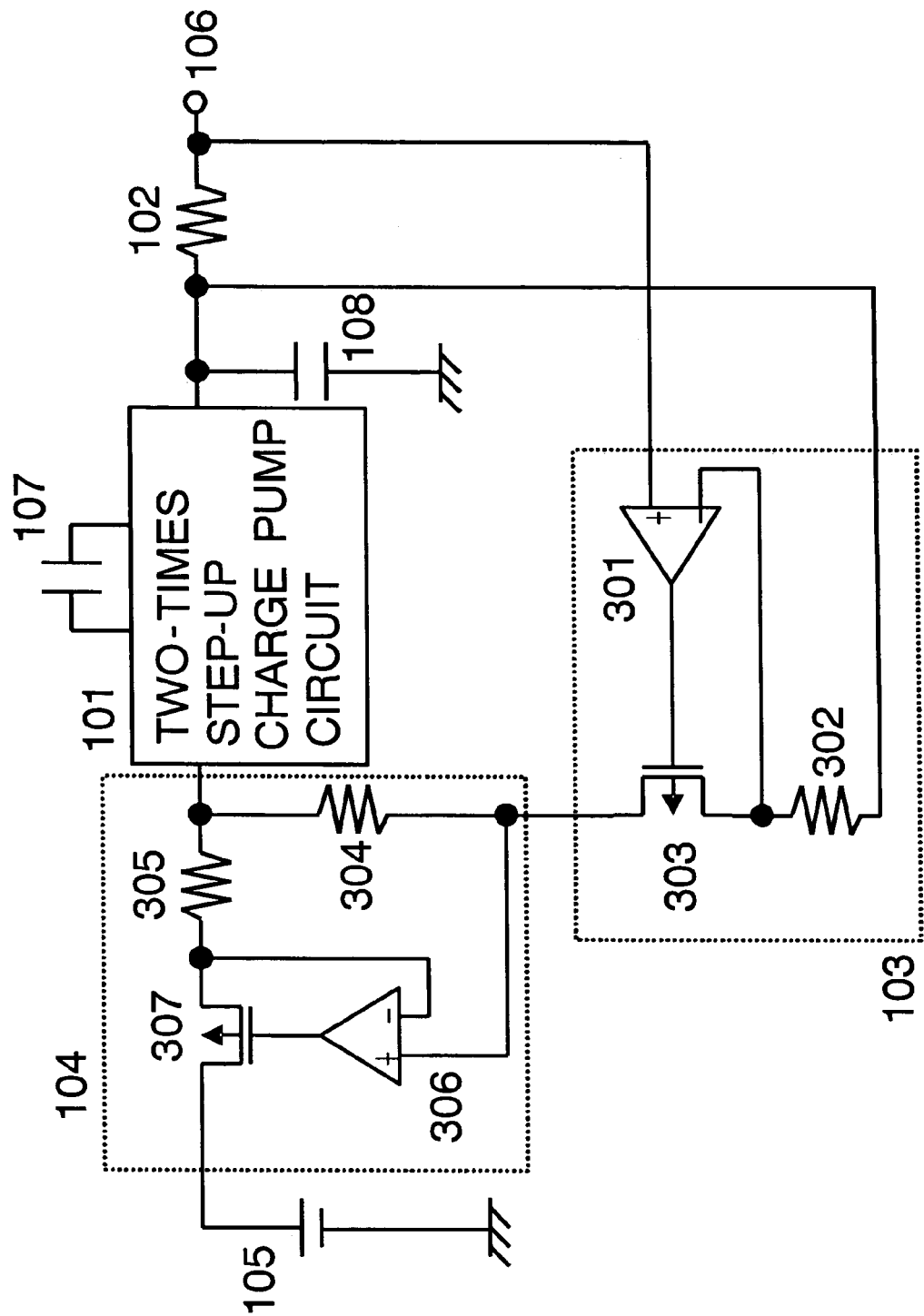
FIG. 3 shows a current limiting mechanism for noise reduction in a charge pump circuit according the present invention.

FIG. 3 shows a current limiting mechanism for noise reduction in a charge pump circuit according to the present invention. Referring to FIG. 3, the current limiting mechanism for noise reduction in a charge pump circuit is now discussed. In the mechanism configured as shown in FIG. 1, the current detecting circuit 103 includes a comparator 301 for comparing the potentials at both ends of the sensing resistor 102, a PMOS transistor 303, and a resistor element 302, which constitute an amplifier circuit. In addition, the current limiting circuit 104 includes a comparator 306 for comparing potentials at both ends of a sensing resistor 305, a PMOS transistor 307, and a resistor element 304, which constitute an amplifier circuit.

It is possible to adjust a current flowing in an input terminal of the charge pump circuit according to an output current by using the current limiting mechanism for noise reduction in a charge pump circuit thus configured. The current detecting circuit 103 includes the comparator 301, the PMOS transistor 303, and the resistor element 302, which constitute the amplifier circuit. Thus, the same voltage as the voltage across the sensing resistor 102 corresponds to the voltage across the resistor element 302. The current limiting circuit 104 includes the comparator 306, the PMOS transistor 307, and the resistor element 304, which constitute the amplifier circuit. The same voltage as the voltage across the sensing resistor 305 corresponds to a voltage across the resistor element 304. At this time, the sensing resistor 305 is set at half the resistance value of the sensing resistor 102, so that if the resistor elements 302 and 304 have the same resistance value, a current is caused to flow in the sensing resistor 305 in an amount twice larger than in the sensing resistor 102. With this circuit configuration, the two-times step-up charge pump circuit is supplied with the input current in an amount about twice larger than the output current according to the output current value to thereby step up the voltage. As a result, the input current is kept at a constant value to thereby suppress noise generation.

As discussed above, according to the present invention, provided is the current limiting circuit where a current flowing in the output terminal of the charge pump circuit is sensed with the sensing resistor to be detected by the current detecting circuit to thereby cause an input current to constantly flow in the input terminal of the charge pump circuit in an amount approximately twice larger than an output current, whereby a current is kept constant to suppress a peak current and to avoid the noise generation. Consequently, other circuits connected to the input power source shared with the charge pump circuit are kept from erroneously operating.

What is claimed is:

1. A semiconductor integrated circuit device including:
   a sensing resistor for detecting a load current in an output terminal of an n-times step-up charge pump circuit, where n is a value greater than one;
   a current detecting circuit for detecting a current flowing in the sensing resistor; and
   a current limiting circuit for adjusting a current value such that a current flows in an input terminal of the n-times step-up charge pump circuit in an amount n times larger than the current flowing in the sensing resistor in accordance with a current value of the current detected by the current detecting circuit,
   wherein the current flowing in the input terminal of the n-times step-up charge pump circuit is kept at the current value n times larger than the current value of the current flowing in the output terminal thereof.

2. A semiconductor integrated circuit device according to claim 1, wherein:
   the current detecting circuit includes; a comparator circuit, a PMOS transistor, and a resistor element; and
   the current limiting circuit includes; a comparator circuit, a PMOS transistor, a resistor element, and an input current sensing resistor.

* * * * *